(12) United States Patent
Takeda et al.

(10) Patent No.: US 11,275,097 B2
(45) Date of Patent: Mar. 15, 2022

(54) METHOD FOR MOUNTING INERTIAL SENSOR UNIT AND INERTIAL SENSOR UNIT

(71) Applicant: SEIKO EPSON CORPORATION, Tokyo (JP)

(72) Inventors: Kazuyoshi Takeda, Chino (JP); Hiroshi Okamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 186 days.

(21) Appl. No.: 16/661,404

(22) Filed: Oct. 23, 2019

(65) Prior Publication Data

US 2020/0124633 A1  Apr. 23, 2020

(30) Foreign Application Priority Data

Oct. 23, 2018  (JP) .............................. JP2018-199185

(51) Int. Cl.
*G01P 1/02*      (2006.01)
*G01P 3/00*      (2006.01)
*G01P 15/02*     (2013.01)

(52) U.S. Cl.
CPC ................ *G01P 1/02* (2013.01); *G01P 1/023* (2013.01); *G01P 3/00* (2013.01); *G01P 15/02* (2013.01)

(58) Field of Classification Search
CPC .. G01P 1/02; G01P 1/023; G01P 15/02; G01P 15/097; G01P 15/09; G01P 15/18; G01P 15/08
See application file for complete search history.

(56) References Cited

U.S. PATENT DOCUMENTS

| 3,610,973 | A | * | 10/1971 | Bauer | ................. | G01R 31/343 |
| | | | | | | 310/15 |
| 4,562,740 | A | * | 1/1986 | Webber | ................. | G01H 11/08 |
| | | | | | | 29/25.35 |
| 5,029,474 | A | * | 7/1991 | Schulze | ................. | G10K 11/02 |
| | | | | | | 73/587 |
| 5,269,185 | A | * | 12/1993 | Froidevaux | ......... | G01D 11/245 |
| | | | | | | 73/430 |
| 2005/0081628 | A1 | | 4/2005 | Nozoe et al. | | |
| 2019/0353506 | A1 | * | 11/2019 | Yoda | .................... | G01D 11/245 |
| 2020/0124633 | A1 | | 4/2020 | Takeda et al. | | |
| 2020/0379002 | A1 | * | 12/2020 | Takeda | ................... | G01P 15/18 |

FOREIGN PATENT DOCUMENTS

| JP | H02-008715 A | | 1/1990 |
| JP | H07-139994 A | | 6/1995 |
| JP | 2003-287436 | | 10/2003 |
| JP | 2014-085223 | | 5/2014 |
| JP | 2014-085233 A | | 5/2014 |
| JP | 2020-139756 | * | 9/2020 |
| WO | WO2014/123144 | | 8/2014 |

OTHER PUBLICATIONS

English Translation of JP2020-139756.*

* cited by examiner

*Primary Examiner* — Helen C Kwok
(74) *Attorney, Agent, or Firm* — Workman Nydegger

(57) ABSTRACT

A method for mounting an inertial sensor unit includes: mounting a substrate to a structure; and mounting, to the substrate, a case in which an inertial sensor is accommodated, wherein the case is provided with a first mounting portion, the substrate is provided with a second mounting portion, and in the mounting of the case, the first mounting portion and the second mounting portion fit together, whereby the case is mounted to the substrate.

13 Claims, 10 Drawing Sheets

METHOD FOR MOUNTING INERTIAL SENSOR UNIT AND INERTIAL SENSOR UNIT

The present application is based on, and claims priority from JP Application Serial Number 2018-199185, filed Oct. 23, 2018, the disclosure of which is hereby incorporated by reference herein in its entirety.

BACKGROUND

1. Technical Field

The present disclosure relates to a method for mounting an inertial sensor unit and an inertial sensor unit.

2. Related Art

In the related art, an inertial sensor such as an acceleration sensor detecting acceleration or a gyro sensor detecting angular velocity has been known.

For example, JP-A-2014-85233 discloses an acceleration sensor including a double tuning fork-type vibrating element made of quartz crystal.

An inertial sensor unit including the inertial sensor described above is mounted, for detecting vibration of a structure such as a building, to the structure. When the inertial sensor unit is mounted by means of a magnet, an impact due to instantaneous attraction by the magnet may be applied to the inertial sensor; and when the inertial sensor unit is mounted using an electric drill, vibration of the electric drill may be applied to the inertial sensor.

However, JP-A-2014-85233 does not disclose how to reduce an unnecessary impact or vibration applied to the inertial sensor when the inertial sensor unit is mounted to the structure such as a building.

SUMMARY

In an aspect of the present disclosure, a method for mounting an inertial sensor unit includes: mounting a substrate to a structure; and mounting, to the substrate, a case in which an inertial sensor is accommodated, wherein the case is provided with a first mounting portion, the substrate is provided with a second mounting portion, and in the mounting of the case, the first mounting portion and the second mounting portion fit together, whereby the case is mounted to the substrate.

In the aspect of the method for mounting an inertial sensor unit, the first mounting portion may be composed of a through-hole provided in the case and a male screw passing through the through-hole, the second mounting portion may be composed of a female screw, and the fit between the first mounting portion and the second mounting portion may be threaded engagement between the male screw that passed through the through-hole and the female screw.

In the aspect of the method for mounting an inertial sensor unit, the first mounting portion may include a female screw, the second mounting portion may be composed of a first through-hole provided in the substrate and a male screw passing through the first through-hole, and the fit between the first mounting portion and the second mounting portion may be threaded engagement between the male screw that passed through the first through-hole and the female screw.

In the aspect of the method for mounting an inertial sensor unit, the first mounting portion may be composed of a second through-hole provided in the case and a nut provided with the female screw threadedly engaging with the male screw that passed through the second through-hole.

In the aspect of the method for mounting an inertial sensor unit, in the mounting of the case, the male screw may be passed through a screw coming-off preventing member located between the case and the substrate.

In the aspect of the method for mounting an inertial sensor unit, three or more fitting portions in each of which the first mounting portion and the second mounting portion fit together may be provided, and in the mounting of the case, the case may be mounted to the substrate such that the inertial sensor is surrounded by a line connecting the three or more fitting portions in plan view in an overlapping direction of the substrate and the case.

In the aspect of the method for mounting an inertial sensor unit, the case may be provided with a third mounting portion, the substrate may be provided with a fourth mounting portion, and in the mounting of the case, a position of the case with respect to the substrate may be determined by fitting together the third mounting portion and the fourth mounting portion.

In the aspect of the method for mounting an inertial sensor unit, the substrate may be provided with a magnet, and in the mounting of the substrate, the substrate may be mounted to the structure by means of the magnet.

In the aspect of the method for mounting an inertial sensor unit, the magnet may be mounted to the substrate by means of a screw and an adhesive.

In the aspect of the method for mounting an inertial sensor unit, three or more magnets may be provided, and in the mounting of the case, the case may be mounted to the substrate such that the inertial sensor is surrounded by a line connecting the three or more magnets in plan view in an overlapping direction of the substrate and the case.

In the aspect of the method for mounting an inertial sensor unit, in the mounting of the substrate, the substrate may be mounted such that an adjustment plate is located between the magnet and the structure, and material of the adjustment plate may be material that does not attract the magnet and that does not repel the magnet.

In the aspect of the method for mounting an inertial sensor unit, the method for mounting an inertial sensor unit may further include coupling the structure and the case with a string.

In an aspect of the present disclosure, an inertial sensor unit includes: a substrate provided with a female screw; a magnet that is provided at the substrate and that mounts the substrate to a structure; a case that is provided with a through-hole and in which an inertial sensor is accommodated; and a male screw that passes through the through-hole and that is threadedly engageable with the female screw.

In the aspect of the inertial sensor unit, the magnet may be mounted to the substrate by means of a screw and an adhesive.

In the aspect of the inertial sensor unit, three or more magnets may be provided, and the inertial sensor may be surrounded by a line connecting the three or more magnets in plan view in an overlapping direction of the substrate and the case.

DESCRIPTION OF EXEMPLARY EMBODIMENTS

Hereinafter, preferred embodiments of the present disclosure will be described in detail with reference to the drawings. The embodiments described below do not unduly limit the details of the present disclosure set forth in the appended claims. Moreover, not all of the configurations described below are essential configuration requirements of the present disclosure.

1. First Embodiment

1.1. Inertial Sensor Unit

Figure 1:
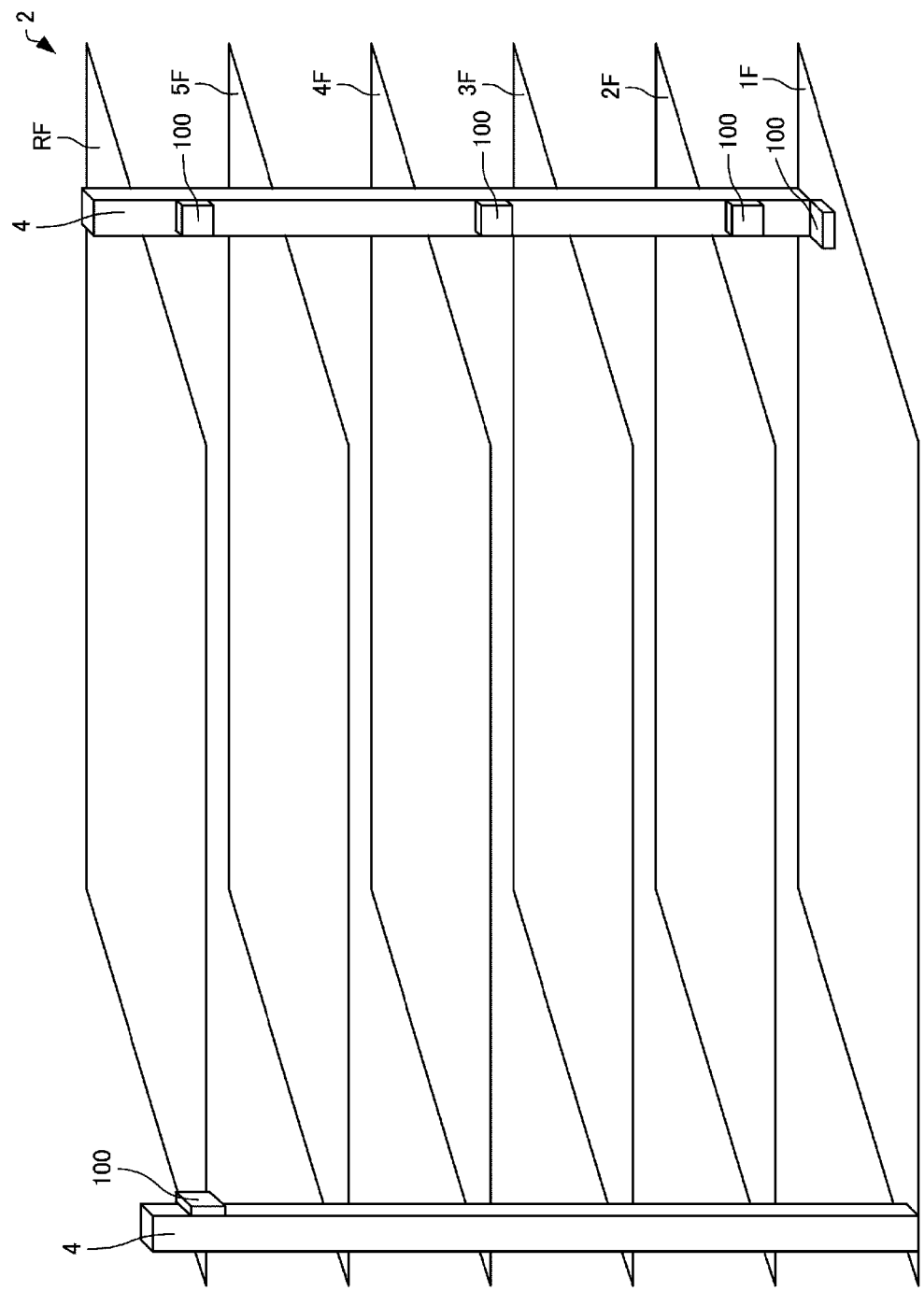
FIG. 1 is a schematic view showing a state in which inertial sensor units according to a first embodiment are mounted to a structure.
Figure 2:
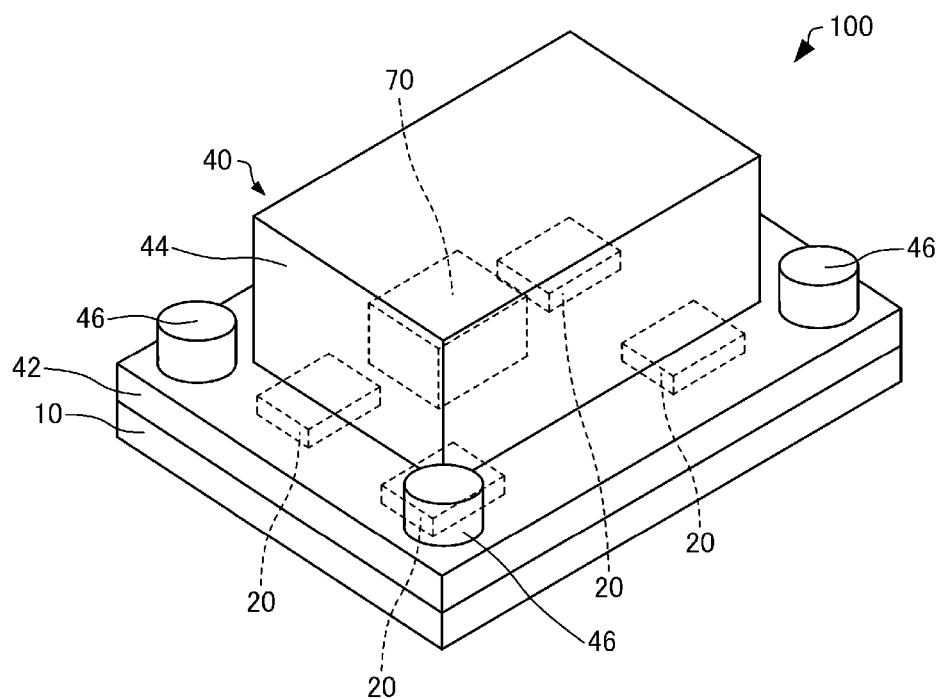
FIG. 2 is a perspective view schematically showing the inertial sensor unit according to the first embodiment.
Figure 3:
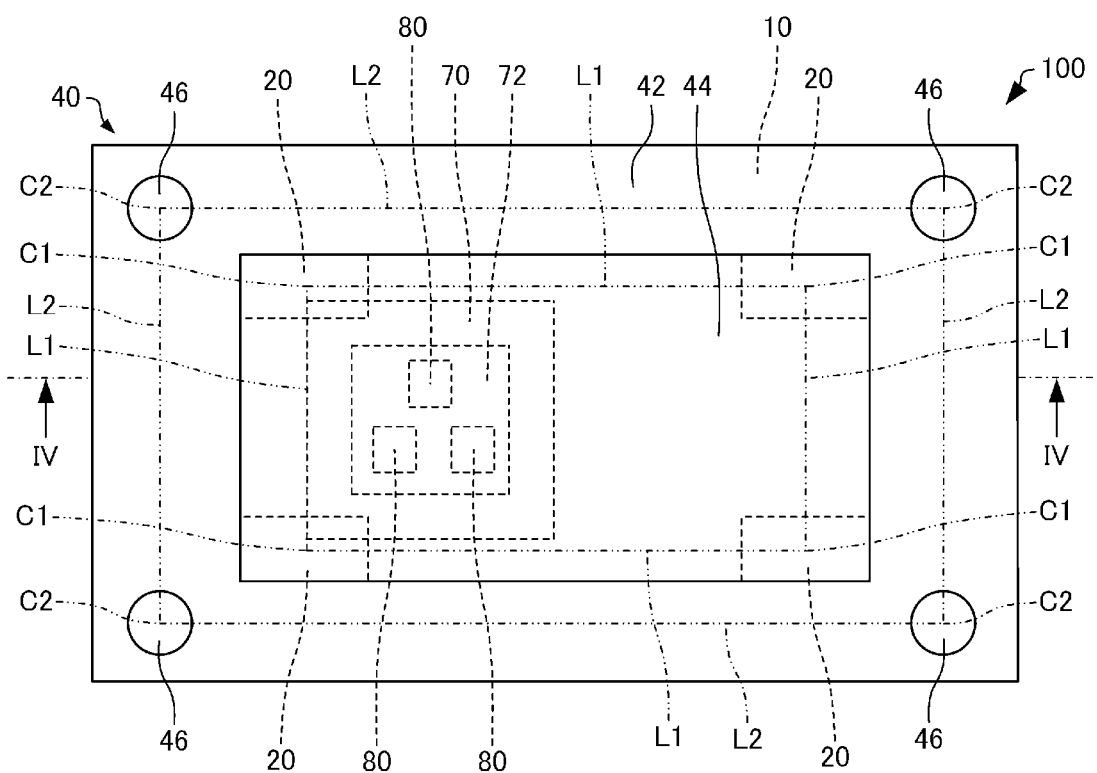
FIG. 3 is a plan view schematically showing the inertial sensor unit according to the first embodiment.
Figure 4:
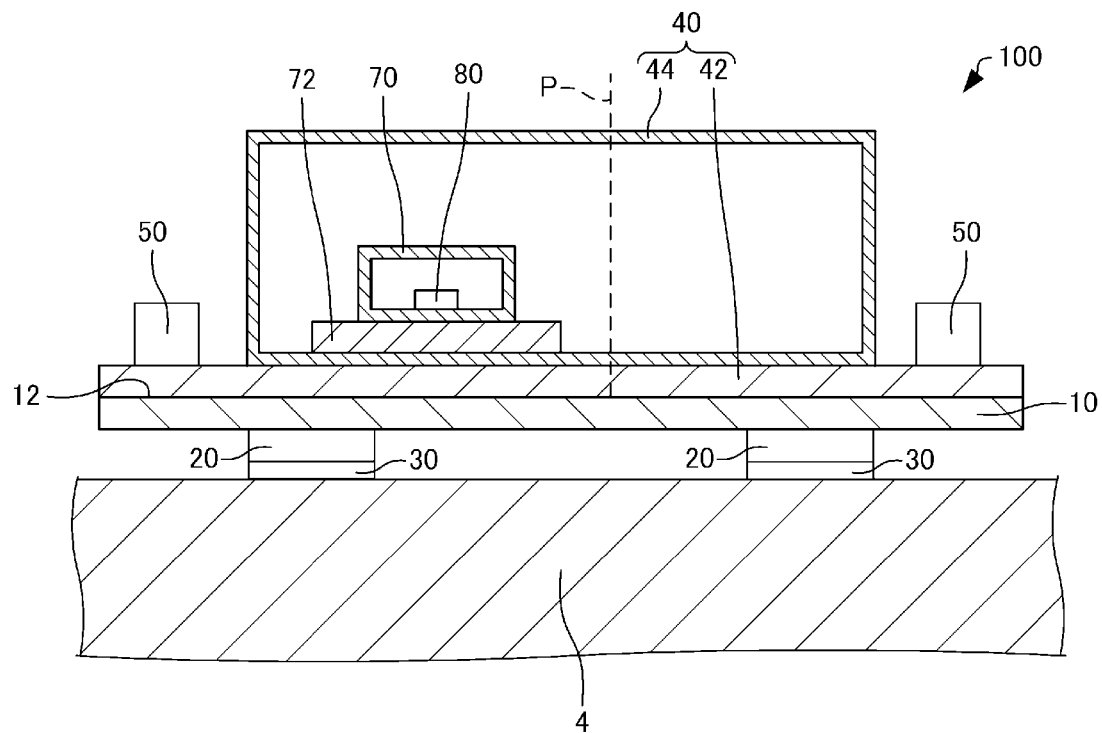
FIG. 4 is a cross-sectional view schematically showing the inertial sensor unit according to the first embodiment.

First, an inertial sensor unit according to a first embodiment will be described with reference to the drawings. FIG. 1 is a schematic view showing a state in which inertial sensor units 100 according to the first embodiment are mounted to a structure. FIG. 2 is a perspective view schematically showing the inertial sensor unit 100 according to the first embodiment. FIG. 3 is a plan view schematically showing the inertial sensor unit 100 according to the first embodiment. FIG. 4 is a cross-sectional view taken along line IV-IV of FIG. 3, schematically showing the inertial sensor unit 100 according to the first embodiment. In FIG. 1, for convenience sake, the inertial sensor unit 100 is illustrated in a simplified manner.

As shown in FIG. 1, the inertial sensor unit 100 is mounted to, for example, a building 2. In the illustrated example, the building 2 is a five-story building including floors 1F to 5F, a roof RF, and steel columns 4. A plurality of the inertial sensor units 100 are mounted. In the illustrated example, four inertial sensor units 100 are mounted to the steel columns 4, and one inertial sensor unit 100 is mounted to the floor 1F.

In the following, a structure to which the inertial sensor unit 100 is mounted will be described as the steel column 4, which is steel. The inertial sensor unit 100 is used as a vibrometer to detect vibration of the steel column 4, for example, vibration due to an earthquake, or the like, or an angle meter to detect the inclination of the steel column 4.

As shown in FIGS. 2 to 4, the inertial sensor unit 100 includes, for example, a first substrate 10, magnets 20, adjustment plates 30, an outer case 40, a sensor case 70, and inertial sensors 80. FIG. 4 illustrates a state in which the inertial sensor unit 100 is mounted to the steel column 4.

The first substrate 10 is mountable to the steel column 4. The first substrate 10 has, for example, a rectangular shape having long sides and short sides in plan view in an overlapping direction of the first substrate 10 and the outer case 40 (hereinafter also referred to as "in plan view"). The length of the inertial sensor unit 100 in the long-side direction is, for example, 100 mm or more and 150 mm or less in length. The length of the inertial sensor unit 100 in the short-side direction is, for example, 70 mm or more and 120 mm or less in length. The length of the inertial sensor unit 100 in a direction orthogonal to the long side and the short side is, for example, 50 mm or more and 120 mm or less. The material of the first substrate 10 is, for example, aluminum, copper, or the like.

The "overlapping direction of the first substrate 10 and the outer case 40" is an extending direction of a normal P to a surface 12 of the first substrate 10 shown in FIG. 4. The surface 12 is a surface of the first substrate 10 at the side at which the outer case 40 is mounted.

The magnet 20 is provided at the first substrate 10. Here, FIG. 5 is a cross-sectional view schematically showing the inertial sensor unit 100 and is an enlarged view in the vicinity of the magnet 20.

Figure 5:
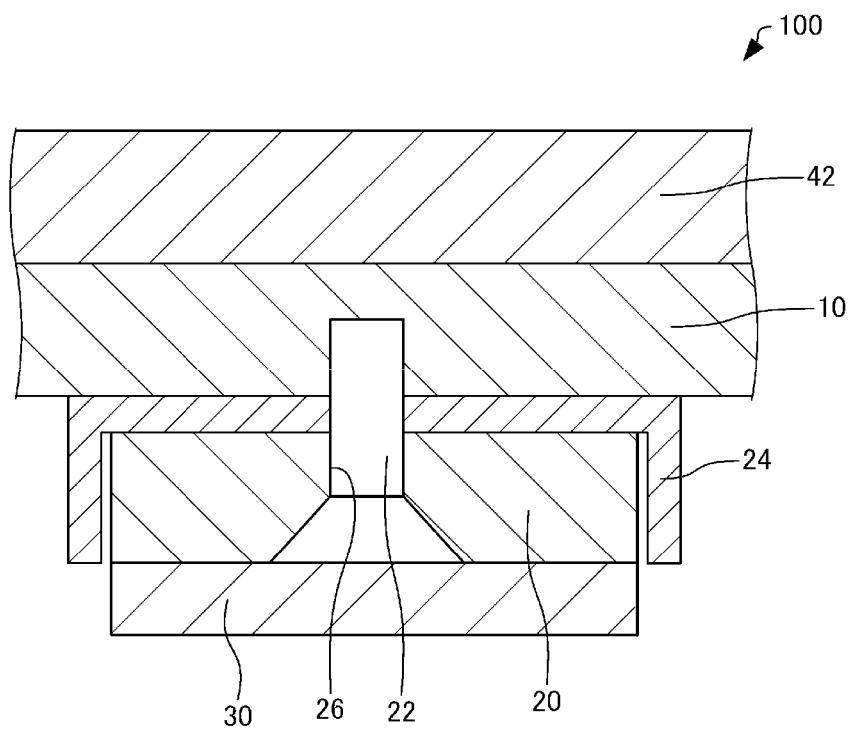
FIG. 5 is a cross-sectional view schematically showing the inertial sensor unit according to the first embodiment.

As shown in FIG. 5, the magnet 20 is mounted to the first substrate 10 by means of a screw 22 and an adhesive. In the illustrated example, a cover member 24 covering the magnet 20 is provided between the magnet 20 and the first substrate 10. The screw 22 is a male screw, and at least one of the first substrate 10 and the cover member 24 may be provided with a female screw that is threadedly engaged with the screw 22. The magnet 20 is provided with a through-hole 26 through which the screw 22 passes. The adhesive may bond the magnet 20 with the cover member 24, or may bond the cover member 24 with the first substrate 10. The adhesive is, for example, an epoxy resin-based adhesive. For convenience sake, the cover member 24 is not illustrated in FIG. 4.

The shape of the magnet 20 is, for example, plate-like. Three or more magnets 20 are provided. In the example shown in FIG. 3, four magnets 20 are provided at the first substrate 10. As shown in FIG. 3, in plan view, the inertial sensors 80 are provided so as to be surrounded by three or more magnets 20. In plan view, the inertial sensors 80 are surrounded by a line connecting the three or more magnets 20. That is, in plan view, the inertial sensors 80 are located in a figure surrounded by an imaginary line L1 connecting the three or more magnets 20. In the illustrated example, the imaginary line L1 connects centers C1 of the three or more magnets 20, and the figure surrounded by the imaginary line L1 is a rectangle. In the illustrated example, all of the inertial sensors 80 are located in the figure surrounded by the imaginary line L1.

The magnet 20 is, for example, a neodymium magnet. The magnet 20 and the steel column 4 attract to each other. The magnet 20 mounts the first substrate 10 to the steel column 4. The material, number, and shape of the magnets 20 is not particularly limited. For example, in plan view, the shape of the magnet 20 may be a circle.

As shown in FIG. 5, the adjustment plate 30 is provided at the magnet 20. The adjustment plate 30 is provided at the opposite side of the magnet 20 from the first substrate 10. As shown in FIG. 4, the adjustment plate 30 is in contact with the steel column 4. The adjustment plate 30 is mounted to the magnet 20 by means of, for example, a screw or adhesive (not shown). The material of the adjustment plate 30 is material that does not attract the magnet 20 and that does not repel the magnet 20. As described above, the material of the adjustment plate 30 is material that is not affected by the magnetic force of the magnet 20. Specifically, the material of the adjustment plate 30 is, for example, wood, aluminum, copper, cloth, or the like.

The outer case 40 is provided at the opposite side of the first substrate 10 from the magnet 20. The outer case 40 includes a second substrate 42, a main body case 44, and male screws 46. The material of the second substrate 42 is, for example, aluminum, copper, or the like. The main body case 44 is supported by the second substrate 42. The inertial sensor 80 is accommodated in the main body case 44. The material of the main body case 44 is, for example, aluminum, copper, plastic, or the like. Here, FIG. 6 is a cross-sectional view schematically showing the inertial sensor unit 100 and is an enlarged view in the vicinity of the male screw 46.

Figure 6:
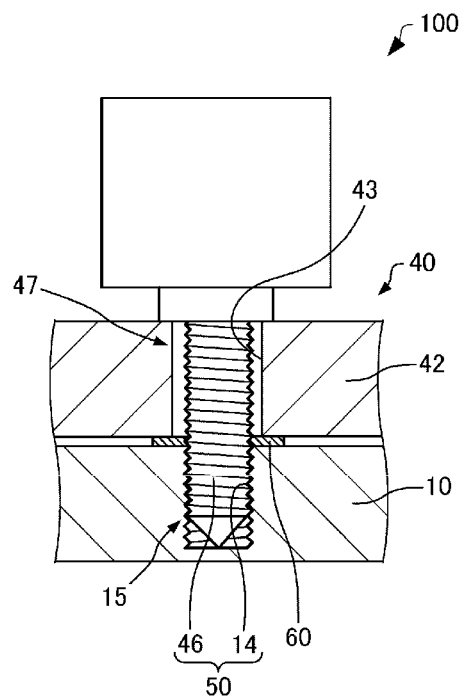
FIG. 6 is a cross-sectional view schematically showing the inertial sensor unit according to the first embodiment.

As shown in FIG. 6, the second substrate 42 is provided with a through-hole 43. The first substrate 10 is provided with a female screw 14. The through-hole 43 and the female screw 14 overlap in plan view.

The male screw 46 passes through the through-hole 43 and is threadedly engaged with the female screw 14. That is, the male screw 46 passes through the through-hole 43 and is screwed into the female screw 14. The through-hole 43 is a loose hole having a diameter larger than the diameter of the male screw 46.

The through-hole 43 and the male screw 46 passing through the through-hole 43 constitute a first mounting portion 47. That is, the outer case 40 is provided with the first mounting portion 47. The female screw 14 constitutes a second mounting portion 15. That is, the first substrate 10 is provided with the second mounting portion 15.

The first mounting portion 47 and the second mounting portion 15 fit together, whereby the outer case 40 is mounted to the first substrate 10. The fit between the first mounting portion 47 and the second mounting portion 15 is threaded engagement between the male screw 46 that passed through the through-hole 43 and the female screw 14. The first mounting portion 47 and the second mounting portion 15 fit to each other to constitute a fitting portion 50. Specifically, the fitting portion 50 is composed of the male screw 46 and the female screw 14.

As shown in FIG. 3, three or more fitting portions 50 are provided. In the illustrated example, four fitting portions 50 are provided. In plan view, the inertial sensors 80 are provided so as to be surrounded by three or more fitting portions 50. In plan view, the inertial sensors 80 are surrounded by a line connecting the three or more fitting portions 50. That is, in plan view, the inertial sensors 80 are located in a figure surrounded by an imaginary line L2 connecting the three or more fitting portions 50. In the illustrated example, the imaginary line L2 connects centers C2 of three or more male screws 46, and the figure surrounded by the imaginary line L2 is a rectangle. In the illustrated example, all of the inertial sensors 80 are located in the figure surrounded by the imaginary line L2.

Figure 7:
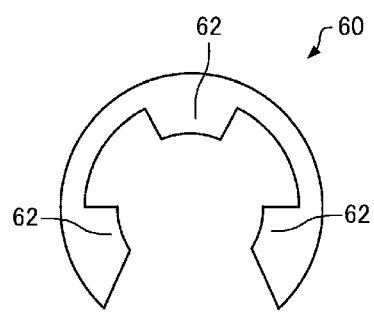
FIG. 7 is a plan view schematically showing a screw coming-off preventing member of the inertial sensor unit according to the first embodiment.

As shown in FIG. 6, a screw coming-off preventing member 60 is provided between the first substrate 10 and the second substrate 42. The screw coming-off preventing member 60 has a size with which the screw coming-off preventing member 60 does not pass through the through-hole 43. The male screw 46 passes through the screw coming-off preventing member 60. Here, FIG. 7 is a plan view schematically showing the screw coming-off preventing member 60. As shown in FIG. 7, the screw coming-off preventing member 60 is an E-ring including contact portions 62 coming in contact with the male screw 46. The screw coming-off preventing member 60 includes, for example, three contact portions 62.

Figure 8:
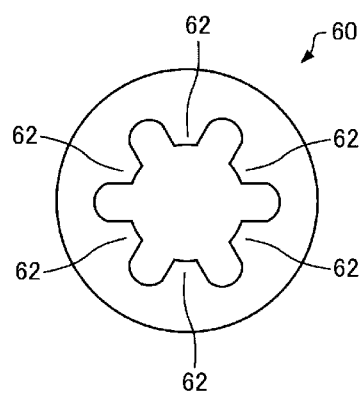
FIG. 8 is a plan view schematically showing the screw coming-off preventing member of the inertial sensor unit according to the first embodiment.

The shape of the screw coming-off preventing member 60 is not particularly limited as long as the screw coming-off preventing member 60 has a coming-off preventing function with respect to the male screw 46. For example, as shown in FIG. 8, the screw coming-off preventing member 60 may have a shape including six contact portions 62. For convenience sake, the screw coming-off preventing member 60 is not illustrated in FIGS. 2, 4, and 5.

As shown in FIG. 4, the sensor case 70 is accommodated in the main body case 44. In the illustrated example, the sensor case 70 is provided in the main body case 44 via a support plate 72. The material of the sensor case 70 is, for example, the same as the main body case 44.

The inertial sensor 80 is accommodated in the sensor case 70. The inertial sensor 80 is, for example, an acceleration sensor. As shown in FIG. 3, three inertial sensors 80 are provided. The three inertial sensors 80 are respectively an acceleration sensor that detects acceleration in the direction of a first axis, an acceleration sensor that detects acceleration in the direction of a second axis, and an acceleration sensor that detects acceleration in the direction of a third axis. The first axis, the second axis, and the third axis are axes orthogonal to each other.

The inertial sensor unit 100 has, for example, the following features.

The inertial sensor unit 100 includes: the first substrate 10 provided with the female screw 14; the magnet 20 that is provided at the first substrate 10 and that mounts the first substrate 10 to the steel column 4; the outer case 40 that is provided with the through-hole 43 and in which the inertial sensor 80 is accommodated; and the male screw 46 that passes through the through-hole 43 and that is threadedly engageable with the female screw 14. Therefore, the first substrate 10 is first mounted to the steel column 4 by means of the magnet 20, and then, the outer case 40 is mounted to the first substrate 10 by means of the male screw 46 and the female screw 14, whereby the inertial sensor unit 100 can be mounted to the steel column 4. Hence, compared to when the inertial sensor unit is directly mounted to a structure such as a building by means of a magnet or an electric drill, it is possible to reduce an unnecessary impact or vibration applied to the inertial sensor 80 when the inertial sensor unit 100 is mounted to the steel column 4. As a result, it is possible to reduce the risk of breakage of the inertial sensor unit 100 due to the unnecessary impact or vibration applied to the inertial sensor 80 when the inertial sensor unit 100 is mounted to the steel column 4.

The inertial sensor 80 may not be an acceleration sensor but may be an angular velocity sensor. The three inertial sensors 80 may be respectively an angular velocity sensor that detects angular velocity about the first axis, an angular velocity sensor that detects angular velocity about the second axis, and an angular velocity sensor that detects angular velocity about the third axis.

Moreover, the number of the inertial sensors 80 is not particularly limited. For example, although not illustrated, acceleration sensors that respectively detect acceleration in the directions of the three axes and angular velocity sensors that respectively detect angular velocity about the three axes may be accommodated in the sensor case 70.

Moreover, although FIG. 4 shows the state in which the inertial sensor unit 100 is mounted to the steel column 4, the inertial sensor unit 100 may not be mounted to the steel column 4 as long as the inertial sensor unit 100 is configured to be mountable to the steel column 4.

Moreover, although FIG. 6 shows the state in which the male screw 46 is threadedly engaged with the female screw 14, the male screw 46 may not be threadedly engaged with the female screw 14 as long as the male screw 46 is configured to be threadedly engageable with the female screw 14. For example, in the inertial sensor unit 100, the first substrate 10 and the outer case 40 may be separated.

1.2. Method for Mounting Inertial Sensor Unit

Figure 9:
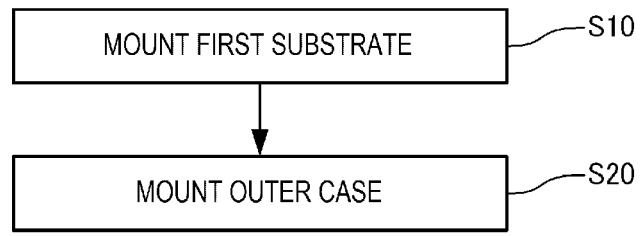
FIG. 9 is a flowchart for explaining a method for mounting the inertial sensor unit according to the first embodiment.
Figure 10:
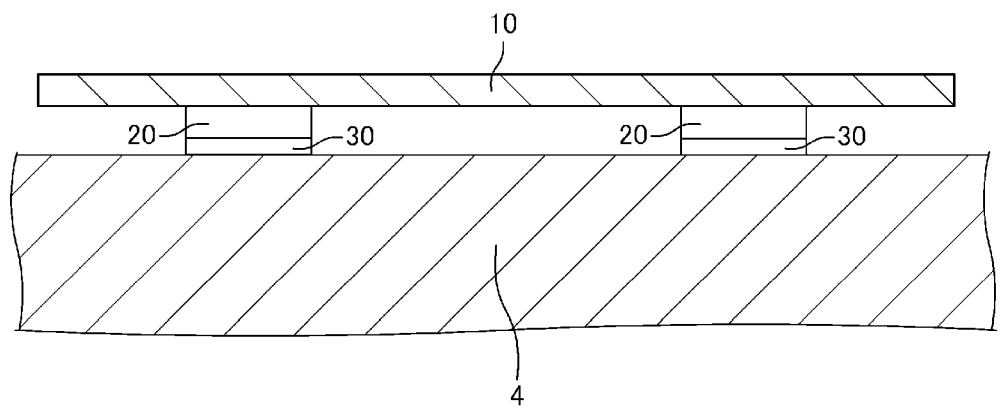
FIG. 10 is a cross-sectional view for explaining the method for mounting the inertial sensor unit according to the first embodiment.

Next, a method for mounting the inertial sensor unit 100 according to the first embodiment will be described with reference to the drawings. FIG. 9 is a flowchart for explaining the method for mounting the inertial sensor unit 100 according to the first embodiment. FIG. 10 is a cross-sectional view for explaining the method for mounting the inertial sensor unit 100 according to the first embodiment.

As shown in FIG. 10, the first substrate 10 is mounted to the steel column 4 (Step S10). Specifically, the first substrate 10 is mounted to the steel column 4 by means of the magnet 20. In the illustrated example, the first substrate 10 is mounted to the steel column 4 such that the adjustment plate 30 is located between the magnet 20 and the steel column 4.

As shown in FIG. 4, the outer case 40 in which the inertial sensor 80 is accommodated is mounted to the first substrate 10 (Step S20). Specifically, as shown in FIG. 6, the first mounting portion 47 and the second mounting portion 15 fit together, whereby the outer case 40 is mounted to the first substrate 10. More specifically, by passing the male screw 46 through the through-hole 43 and causing the male screw 46 to threadedly engage with the female screw 14, the outer case 40 is mounted to the first substrate 10. In the illustrated example, by further passing the male screw 46 through the screw coming-off preventing member 60 located between the outer case 40 and the first substrate 10 and causing the male screw 46 to threadedly engage with the female screw 14, the outer case 40 is mounted to the first substrate 10.

The method for mounting the inertial sensor unit 100 has, for example, the following features.

The method for mounting the inertial sensor unit 100 includes Step S10 in which the first substrate 10 is mounted to the steel column 4, and Step S20 in which the outer case 40 in which the inertial sensor 80 is accommodated is mounted to the first substrate 10. The outer case 40 is provided with the first mounting portion 47, and the first substrate 10 is provided with the second mounting portion 15. In Step S20, the first mounting portion 47 and the second mounting portion 15 fit together, whereby the outer case 40 is mounted to the first substrate 10. Therefore, compared to when the inertial sensor unit is directly mounted to a structure such as a building by means of a magnet or an electric drill, it is possible to reduce an unnecessary impact or vibration applied to the inertial sensor 80 when the inertial sensor unit 100 is mounted to the steel column 4. As a result, it is possible to reduce the risk of breakage of the inertial sensor unit 100 due to the unnecessary impact or vibration applied to the inertial sensor 80 when the inertial sensor unit 100 is mounted to the steel column 4.

In the method for mounting the inertial sensor unit 100, the first mounting portion 47 is composed of the through-hole 43 provided in the outer case 40 and the male screw 46 passing through the through-hole 43, and the second mounting portion 15 is composed of the female screw 14. The fit between the first mounting portion 47 and the second mounting portion 15 is threaded engagement between the male screw 46 that passed through the through-hole 43 and the female screw 14. Therefore, in the method for mounting the inertial sensor unit 100, the outer case 40 can be mounted to the first substrate 10 by the threaded engagement between the male screw 46 and the female screw 14.

In the method for mounting the inertial sensor unit 100, in Step S20, the male screw 46 is passed through the screw coming-off preventing member 60 located between the outer case 40 and the first substrate 10. Therefore, after the inertial sensor unit 100 is mounted to the steel column 4 and then, for example, vibration of the steel column 4 is measured, the male screw 46 can be prevented from coming off the outer case 40 and accidentally falling when the inertial sensor unit 100 is removed from the steel column 4. In some cases, the inertial sensor unit 100 is mounted at a high place such as a building, and therefore, falling prevention of the male screw 46 is especially required.

In the method for mounting the inertial sensor unit 100, three or more fitting portions 50 in each of which the first mounting portion 47 and the second mounting portion 15 fit together are provided, and the outer case 40 is mounted to the first substrate 10 in Step S20 such that, in plan view, the inertial sensor 80 is surrounded by the line connecting the three or more fitting portions 50. Therefore, in the method for mounting the inertial sensor unit 100, compared to when the inertial sensor is not surrounded by the line connecting the three or more fitting portions in plan view, for example even when the outer case 40 vibrates, the inertial sensor 80 is less likely to vibrate due to the vibration, and vibration of the steel column 4 can be detected more accurately.

In the method for mounting the inertial sensor unit 100, the magnet 20 is provided at the first substrate 10, and the first substrate 10 is mounted by means of the magnet 20 in Step S10. Therefore, when the first substrate 10 is removed from the steel column 4 after the inertial sensor unit 100 is mounted to the steel column 4, the steel column 4 is not damaged. For example, when the first substrate is mounted to a structure by means of an adhesive, a double-faced tape, welding, or the like, the structure is damaged in some cases such as peeling off of the paint of the structure in removal of the first substrate.

In the method for mounting the inertial sensor unit 100, the magnet 20 is mounted to the first substrate 10 by means of the screw 22 and the adhesive. Therefore, for example compared to when the magnet is mounted by means of only one of a screw and an adhesive, the magnet 20 is firmly mounted to the first substrate 10.

In the method for mounting the inertial sensor unit 100, three or more magnets 20 are provided, and the outer case 40 is mounted to the first substrate 10 in Step S20 such that, in plan view, the inertial sensor 80 is surrounded by the line connecting the three or more magnets 20. Therefore, in the method for mounting the inertial sensor unit 100, compared to when the inertial sensor is not surrounded by the line connecting the three or more magnets in plan view, for example even when the first substrate 10 vibrates, the inertial sensor 80 is less likely to vibrate due to the vibration, and vibration of the steel column 4 can be detected more accurately.

In the method for mounting the inertial sensor unit 100, the first substrate 10 is mounted in Step S10 such that the adjustment plate 30 is located between the magnet 20 and the steel column 4, and the material of the adjustment plate 30 is material that does not attract the magnet 20 and that does not repel the magnet 20. Therefore, it is possible to reduce the risk that the magnet 20 does not separate from the steel column 4 when the inertial sensor unit 100 is removed from the steel column 4 because, for example, the magnetic force of the magnet 20 is very strong. As described above, the adjustment plate 30 can adjust the magnetic force of the magnet 20 acting on the steel column 4.

Figure 11:
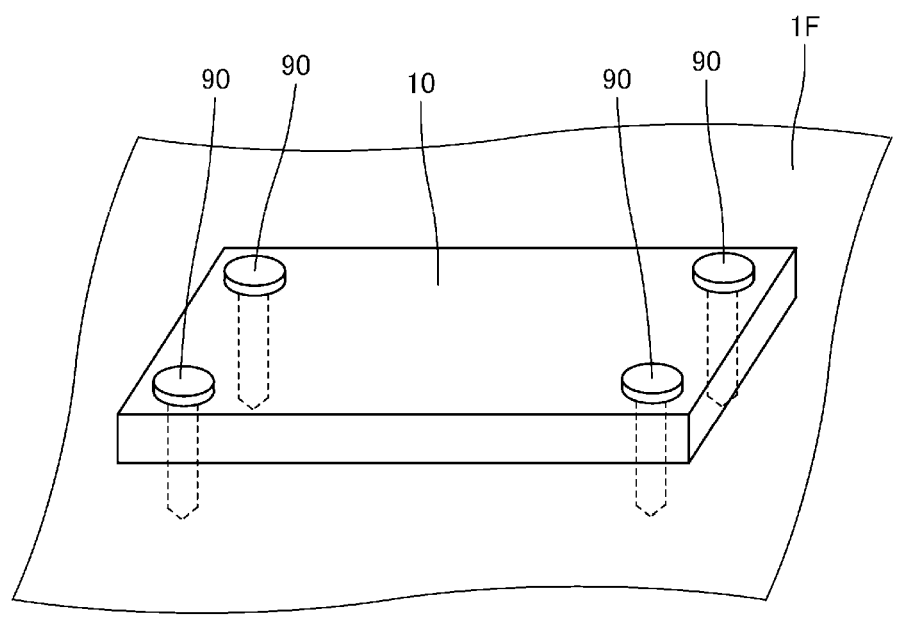
FIG. 11 is a schematic view showing a state in which the inertial sensor unit according to the first embodiment is mounted to a structure.

Although, in the above, the structure to which the inertial sensor unit 100 is mounted has been described as the steel column 4 of the building 2 shown in FIG. 1, the structure to which the inertial sensor unit 100 is mounted may be the floor 1F of the building 2 as shown in FIG. 1. The floor 1F is, for example, a concrete floor. In this case, as shown in FIG. 11, the first substrate 10 may be mounted to the floor 1F by, for example, screwing screws 90 into the floor 1F by means of an electric drill. In this case, the inertial sensor unit 100 does not include the magnet 20, the screw 22, the cover member 24, and the adjustment plate 30.

Moreover, the structure to which the inertial sensor unit 100 is mounted is not limited to a building, and may be, for example, a power transmission tower, a wind power generator, an electric bulletin board on a road, or the like.

1.3. Modified Examples of Inertial Sensor Unit

1.3.1. First Modified Example

Figure 12:
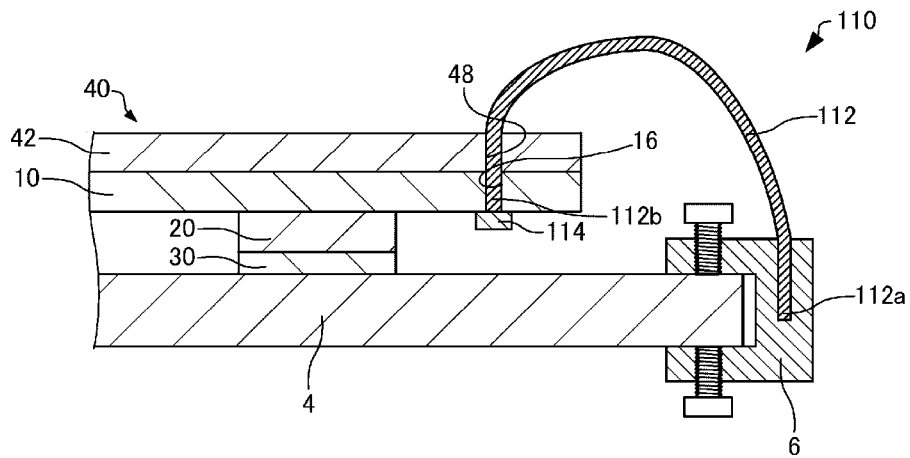
FIG. 12 is a cross-sectional view schematically showing an inertial sensor unit according to a first modified example of the first embodiment.

Next, an inertial sensor unit according to a first modified example of the first embodiment will be described with reference to the drawing. FIG. 12 is a cross-sectional view schematically showing an inertial sensor unit 110 according to the first modified example of the first embodiment. For convenience sake, in FIG. 12, the main body case 44 of the inertial sensor unit 110 is not illustrated.

Hereinafter, in the inertial sensor unit 110 according to the first modified example of the first embodiment, differences from the example of the inertial sensor unit 100 according to the first embodiment described above are described, and similarities are not described. The same applies to later-described inertial sensor units according to second to fifth modified examples of the first embodiment.

As shown in FIG. 12, the inertial sensor unit 110 differs from the inertial sensor unit 100 described above in including a string 112.

The string 112 couples the steel column 4 to the second substrate 42 of the outer case 40. In the illustrated example, the string 112 couples the steel column 4 to the second substrate 42 via a mounting member 6 mounted to the steel column 4. The mounting member 6 may be a C-clamp. The mounting member 6 is configured so as to fix a first end 112*a* of the string 112. The string 112 may be rope-like.

The first substrate 10 is provided with a through-hole 16. The second substrate 42 is provided with a through-hole 48. In the illustrated example, the string 112 passes through the through-hole 48, and a second end 112*b* of the string 112 is located in the through-hole 16. A stopper 114 is provided at the second end 112*b*. The stopper 114 has a size with which the stopper 114 does not pass through the through-hole 16.

Figure 13:
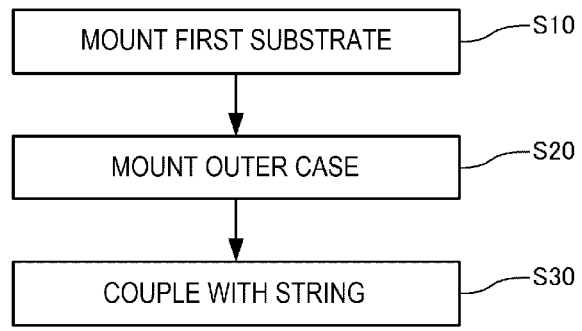
FIG. 13 is a flowchart for explaining a method for mounting the inertial sensor unit according to the first modified example of the first embodiment.

FIG. 13 is a flowchart for explaining a method for mounting the inertial sensor unit 110. As shown in FIG. 13, after Step S20, the steel column 4 and the second substrate 42 of the outer case 40 are coupled with the string 112 (Step S30). Specifically, the mounting member 6 to which the first end 112*a* of the string 112 is fixed is mounted to the steel column 4. As described above, the steel column 4 and the second substrate 42 can be coupled by means of the string 112.

In the method for mounting the inertial sensor unit 110, the steel column 4 and the second substrate 42 are coupled with the string 112, and therefore, the inertial sensor unit 110 can be prevented from accidentally falling when the inertial sensor unit 110 is removed from the steel column 4.

The step for coupling the steel column 4 and the second substrate 42 with the string 112 may be performed before Step S10, or may be performed between Step S10 and Step S20.

1.3.2. Second Modified Example

Figure 14:
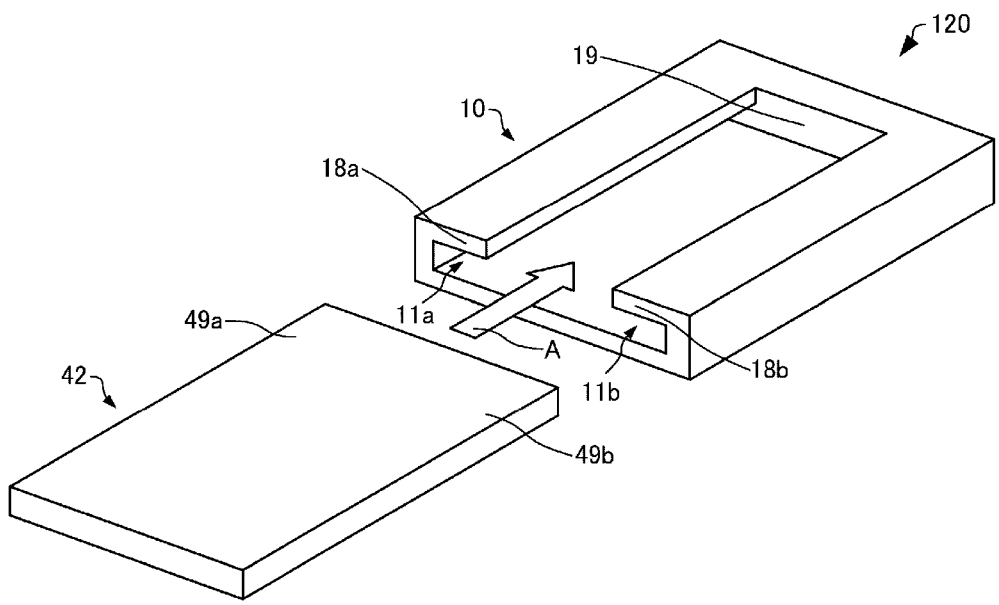
FIG. 14 is a perspective view schematically showing an inertial sensor unit according to a second modified example of the first embodiment.

Next, the inertial sensor unit according to the second modified example of the first embodiment will be described with reference to the drawing. FIG. 14 is a perspective view schematically showing an inertial sensor unit 120 according to the second modified example of the first embodiment. For convenience sake, in FIG. 14, members other than the first substrate 10 and the second substrate 42 are not illustrated. Moreover, FIG. 14 shows a state before the first substrate 10 is mounted to the outer case 40.

As shown in FIG. 14, the inertial sensor unit 120 differs from the inertial sensor unit 100 described above in including third mounting portions 49*a* and 49*b* and fourth mounting portions 18*a* and 18*b*.

The second substrate 42 of the outer case 40 is provided with the third mounting portions 49*a* and 49*b*. The first substrate 10 is provided with the fourth mounting portions 18*a* and 18*b*. As shown in FIG. 14, the second substrate 42 is inserted, while being slid in the direction of the arrow A, into grooves 11*a* and 11*b* provided in the first substrate 10, the third mounting portion 49*a* and the fourth mounting portion 18*a* fit together, and the third mounting portion 49*b* and the fourth mounting portion 18*b* fit together. The fourth mounting portion 18*a* is provided along the direction A and defines the groove 11*a* into which the third mounting portion 49*a* is inserted. The fourth mounting portion 18*b* is provided along the direction A and defines the groove 11*b* into which the third mounting portion 49*b* is inserted. The fourth mounting portions 18*a* and 18*b* are provided so as to face each other. The first substrate 10 is provided with a stopper 19 to stop the movement of the first substrate 10. The stopper 19 is provided at the opposite side from the insertion side for the second substrate 42. In the illustrated example, the stopper 19 couples the third mounting portion 49a and the third mounting portion 49b.

In a method for mounting the inertial sensor unit 120, in Step S20 in which the outer case 40 is mounted, the second substrate 42 of the outer case 40 is first moved in the direction of the arrow A with respect to the first substrate 10, the third mounting portion 49a and the fourth mounting portion 18a are fitted together, and the third mounting portion 49b and the fourth mounting portion 18b are fitted together. Then, the second substrate 42 is moved until the second substrate 42 comes in contact with the stopper 19. With this configuration, the position of the outer case 40 with respect to the first substrate 10 is determined. Next, as shown in FIG. 6, the second substrate 42 is mounted to the first substrate 10 by means of the male screw 46 and the female screw 14.

In the method for mounting the inertial sensor unit 120, the outer case 40 is provided with the third mounting portions 49a and 49b, and the first substrate 10 is provided with the fourth mounting portions 18a and 18b. In Step S20 in which the outer case 40 is mounted, the third mounting portions 49a and 49b and the fourth mounting portions 18a and 18b are fitted together, whereby the position of the outer case 40 with respect to the first substrate 10 is determined. Therefore, in the method for mounting the inertial sensor unit 120, compared to when the third mounting portion and the fourth mounting portion are not provided, the outer case 40 can be disposed at a more accurate position with respect to the first substrate 10.

1.3.3. Third Modified Example

Figure 15:
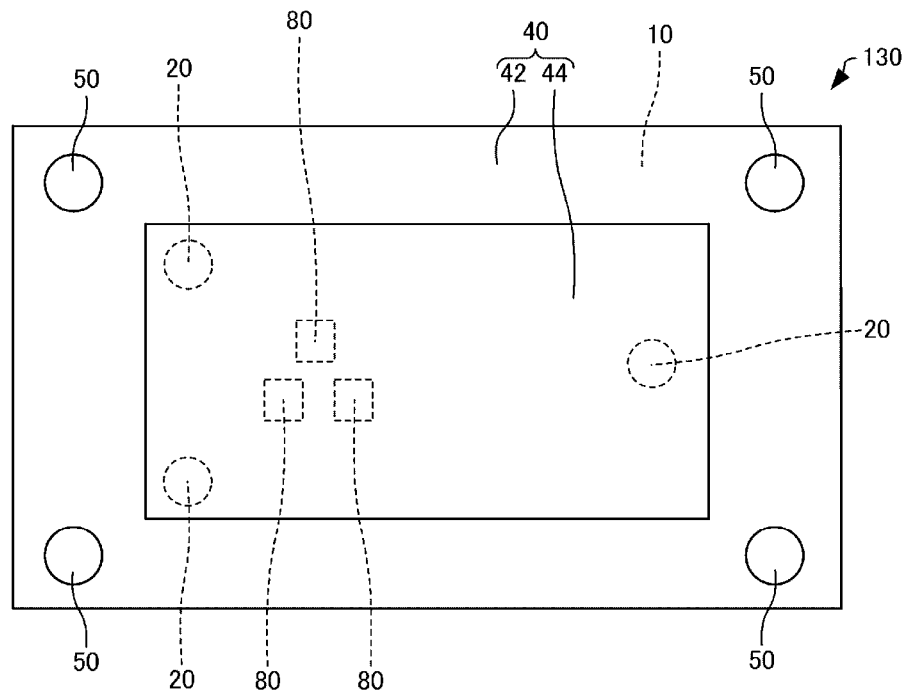
FIG. 15 is a plan view schematically showing an inertial sensor unit according to a third modified example of the first embodiment.

Next, the inertial sensor unit according to the third modified example of the first embodiment will be described with reference to the drawing. FIG. 15 is a plan view schematically showing an inertial sensor unit 130 according to the third modified example of the first embodiment.

In the inertial sensor unit 100 described above, four magnets 20 are mounted as shown in FIG. 3. In contrast to this, in the inertial sensor unit 130, three magnets 20 are mounted as shown in FIG. 15. In the illustrated example, the shape of the magnet 20 is a circle in plan view.

1.3.4. Fourth Modified Example

Figure 16:
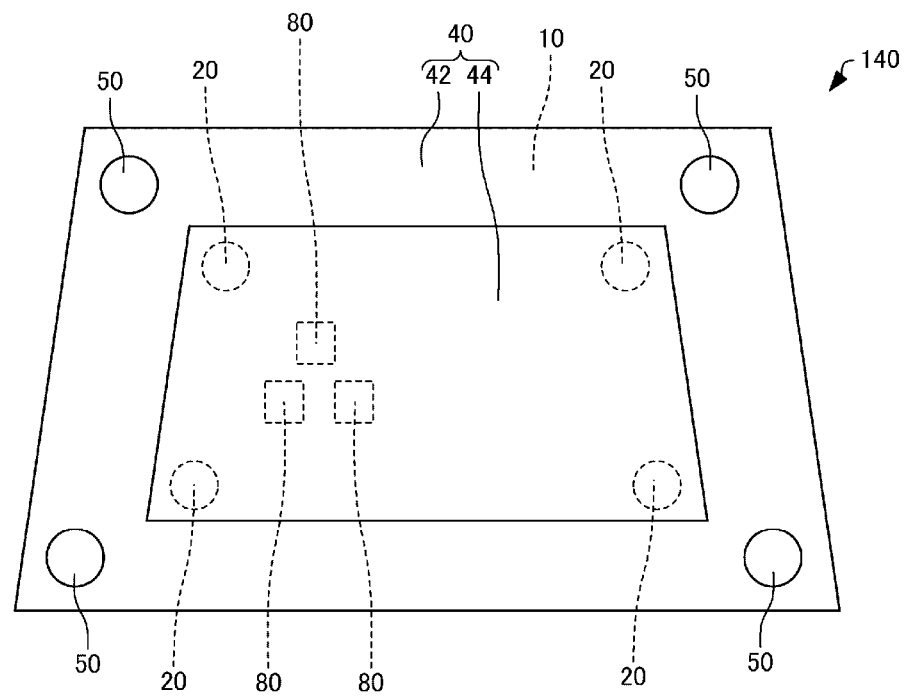
FIG. 16 is a plan view schematically showing an inertial sensor unit according to a fourth modified example of the first embodiment.

Next, the inertial sensor unit according to the fourth modified example of the first embodiment will be described with reference to the drawings. FIG. 16 is a plan view schematically showing an inertial sensor unit 140 according to the fourth modified example of the first embodiment.

Figure 17:
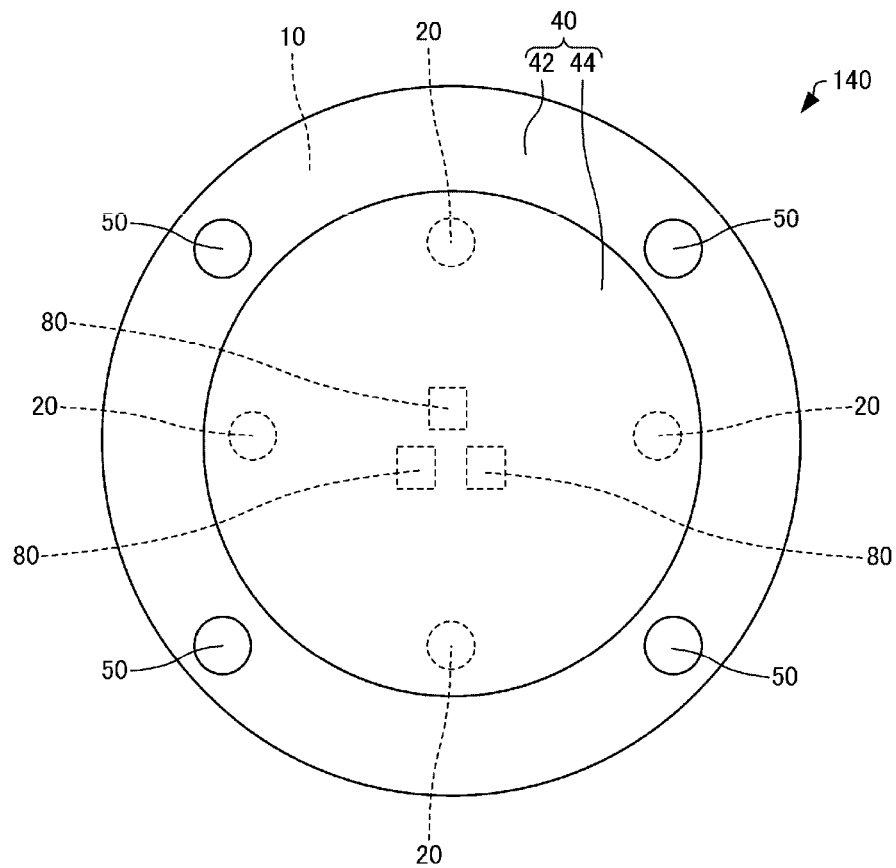
FIG. 17 is a plan view schematically showing the inertial sensor unit according to the fourth modified example of the first embodiment.

In the inertial sensor unit 100 described above, the shapes of the substrates 10 and 42 and the main body case 44 are rectangles in plan view as shown in FIG. 3. In contrast to this, in the inertial sensor unit 140, the shapes of the substrates 10 and 42 and the main body case 44 are trapezoids in plan view as shown in FIG. 16. The shapes of the substrates 10 and 42 and the main body case 44 are not particularly limited, and may be circles as shown in FIG. 17. In the examples shown in FIGS. 16 and 17, the shape of the magnet 20 is a circle in plan view.

1.3.5. Fifth Modified Example

Figure 18:
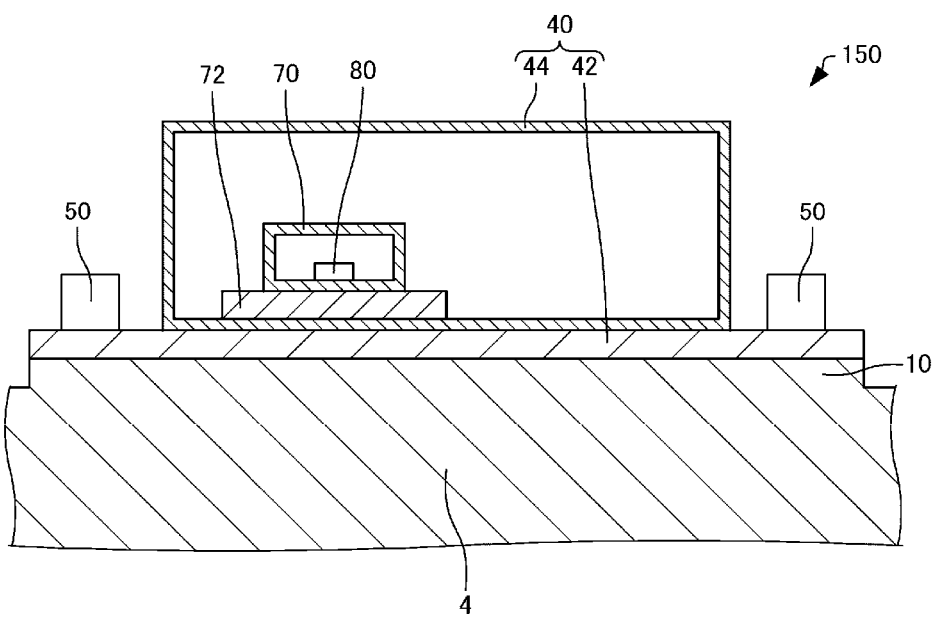
FIG. 18 is a cross-sectional view schematically showing an inertial sensor unit according to a fifth modified example of the first embodiment.
Figure 19:
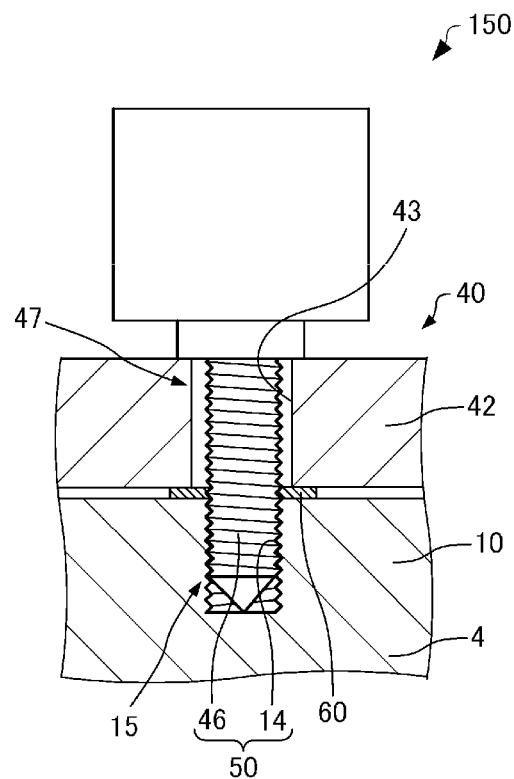
FIG. 19 is a cross-sectional view schematically showing the inertial sensor unit according to the fifth modified example of the first embodiment.

Next, the inertial sensor unit according to the fifth modified example of the first embodiment will be described with reference to the drawings. FIG. 18 is a cross-sectional view schematically showing an inertial sensor unit 150 according to the fifth modified example of the first embodiment. FIG. 19 is a cross-sectional view schematically showing the inertial sensor unit 150 according to the fifth modified example of the first embodiment and is an enlarged view in the vicinity of the male screw 46.

In the inertial sensor unit 100 described above, as shown in FIG. 4, the first substrate 10 and the steel column 4 are separate members. In contrast to this, in the inertial sensor unit 150, the first substrate 10 and the steel column 4 are integrated together as shown in FIG. 18.

The first substrate 10 and the steel column 4 may be integrated together by welding the first substrate 10 to the steel column 4, or the first substrate 10 and the steel column 4 may be integrated together by shaping one material. The inertial sensor unit 150 does not include the magnet 20, the screw 22, the cover member 24, and the adjustment plate 30.

As shown in FIG. 19, the second substrate 42 is provided with the through-hole 43. The first substrate 10 is provided with the female screw 14. The through-hole 43 and the female screw 14 overlap in plan view.

The male screw 46 passes through the through-hole 43 and is threadedly engaged with the female screw 14. That is, the male screw 46 passes through the through-hole 43 and is screwed into the female screw 14. The through-hole 43 is a hole having a diameter larger than the diameter of the male screw 46.

In the inertial sensor unit 150, the first substrate 10 and the steel column 4 are integrated together. Therefore, a female screw can be provided in a portion of the first substrate 10, and the strength of the steel column 4 can be increased compared to when the female screw is provided in a portion of the steel column.

2. Second Embodiment

2.1. Inertial Sensor Unit

Figure 20:
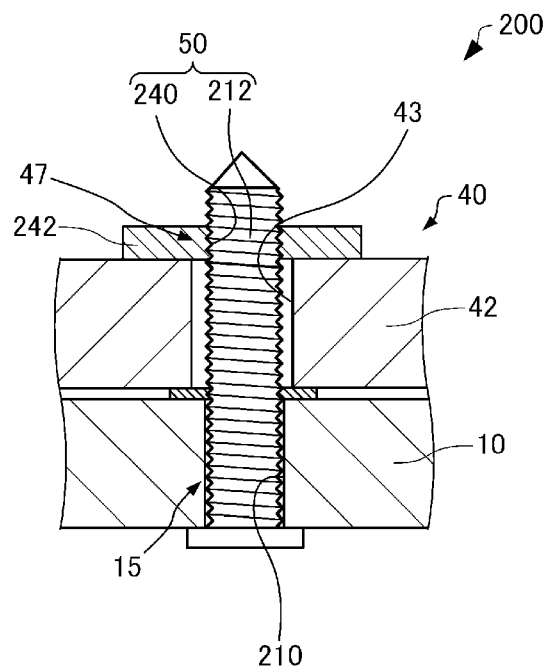
FIG. 20 is a cross-sectional view schematically showing an inertial sensor unit according to a second embodiment.

Next, an inertial sensor unit according to a second embodiment will be described with reference to the drawing. FIG. 20 is a cross-sectional view schematically showing an inertial sensor unit 200 according to the second embodiment.

Hereinafter, in the inertial sensor unit 200 according to the second embodiment, differences from the example of the inertial sensor unit 100 according to the first embodiment described above are described, and similarities are not described.

In the inertial sensor unit 100 described above, as shown in FIG. 6, the first mounting portion 47 is composed of the through-hole 43 and the male screw 46, and the second mounting portion 15 is composed of the female screw 14.

In contrast to this, in the inertial sensor unit 200 as shown in FIG. 20, the first mounting portion 47 includes a female screw 240, and the second mounting portion 15 is composed of a through-hole 210 as a first through-hole provided in the first substrate 10 and a male screw 212 passing through the through-hole 210.

The first substrate 10 includes the male screw 212. The male screw 212 is inserted into the through-hole 210 from the opposite side from the second substrate 42. The male screw 212 may fit into the through-hole 210. A female screw that threadedly engages with the male screw 212 may be provided in a surface of the first substrate 10 that defines the through-hole 210.

The outer case 40 includes a nut 242. The nut 242 is provided with the female screw 240. The female screw 240 threadedly engages with the male screw 212 that passed through the through-hole 43 as a second through-hole. The first mounting portion 47 is composed of the through-hole 43 and the nut 242. The fit between the first mounting portion 47 and the second mounting portion 15 is threaded engagement between the male screw 212 that passed through the through-hole 43 and the female screw 240. The male screw 212 and the female screw 240 constitute the fitting portion 50.

2.2. Method for Mounting Inertial Sensor Unit

Next, a method for mounting the inertial sensor unit 200 according to the second embodiment will be described with reference to the drawing.

In a step for mounting the outer case 40, as shown in FIG. 20, the outer case 40 is disposed at the first substrate 10 such that the male screw 212 passes through the through-hole 43. Next, the female screw 240 provided in the nut 242 is threadedly engaged with the male screw 212 that passed through the through-hole 43.

Other than those described above, the method for mounting the inertial sensor unit 200 is basically the same as the method for mounting the inertial sensor unit 100.

The method for mounting the inertial sensor unit 200 has, for example, the following features.

In the method for mounting the inertial sensor unit 200, the first mounting portion 47 includes the female screw 240, and the second mounting portion 15 is composed of the through-hole 210 provided in the first substrate 10 and the male screw 212 passing through the through-hole 210. The fit between the first mounting portion 47 and the second mounting portion 15 is threaded engagement between the male screw 212 that passed through the through-hole 210 and the female screw 240. Therefore, in the method for mounting the inertial sensor unit 200, the outer case 40 can be mounted to the first substrate 10 by threaded engagement between the male screw 212 and the female screw 240.

In the method for mounting the inertial sensor unit 200, the first mounting portion 47 is composed of the through-hole 43 provided in the outer case 40 and the nut 242 provided with the female screw 240 threadedly engaging with the male screw 212 that passed through the through-hole 43. Therefore, in the method for mounting the inertial sensor unit 200, the outer case 40 can be mounted to the first substrate 10 by means of the nut 242.

3. Third Embodiment

3.1. Inertial Sensor Unit

Figure 21:
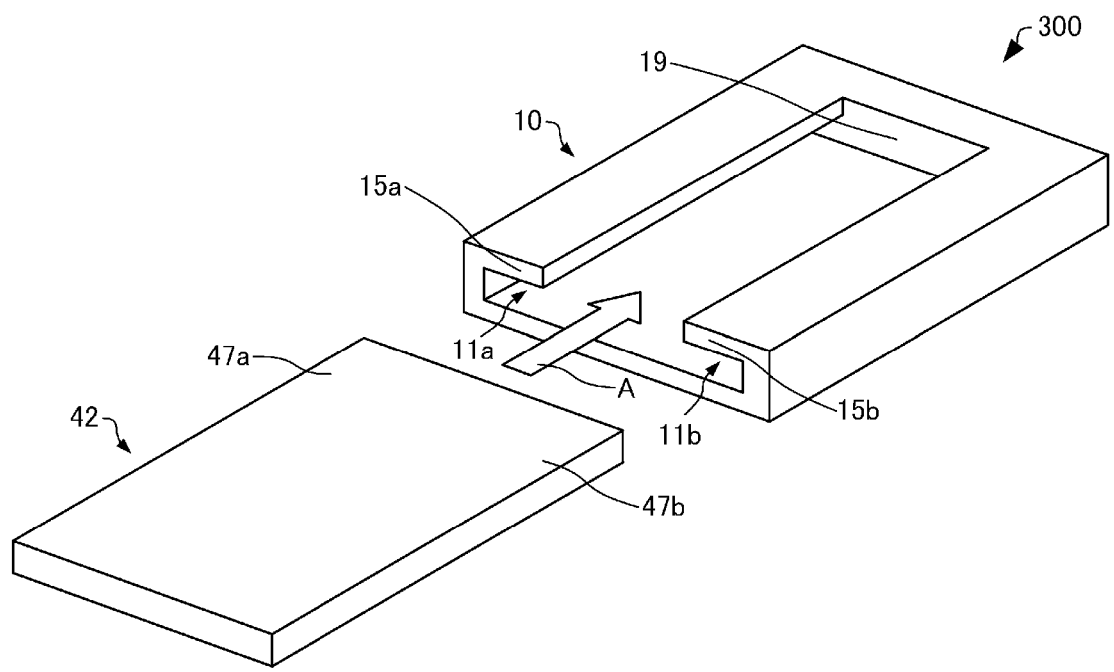
FIG. 21 is a perspective view schematically showing an inertial sensor unit according to a third embodiment.

Next, an inertial sensor unit according to a third embodiment will be described with reference to the drawing. FIG. 21 is a perspective view schematically showing an inertial sensor unit 300 according to the third embodiment. For convenience sake, in FIG. 21, members other than the first substrate 10 and the second substrate 42 are not illustrated. Moreover, FIG. 21 shows a state before the first substrate 10 is mounted to the outer case 40.

Hereinafter, in the inertial sensor unit 300 according to the third embodiment, differences from the example of the inertial sensor unit 100 according to the first embodiment described above are described, and similarities are not described.

In the inertial sensor unit 100 described above, as shown in FIG. 6, the first mounting portion 47 is composed of the through-hole 43 and the male screw 46, and the second mounting portion 15 is composed of the female screw 14.

In contrast to this, in the inertial sensor unit 300 as shown in FIG. 21, the second substrate 42 is inserted, while being slid in the direction of the arrow A, into the grooves 11a and 11b provided in the first substrate 10, a first mounting portion 47a and a second mounting portion 15a fit together, and a first mounting portion 47b and a second mounting portion 15b fit together. The second mounting portion 15a is provided along the direction A and defines the groove 11a into which the first mounting portion 47a is inserted. The second mounting portion 15b is provided along the direction A and defines the groove 11b into which the first mounting portion 47b is inserted. The second mounting portions 15a and 15b are provided so as to face each other. The first substrate 10 is provided with the stopper 19 to stop the movement of the first substrate 10. The stopper 19 is provided at the opposite side from the insertion side for the second substrate 42. In the illustrated example, the stopper 19 couples the first mounting portion 47a and the first mounting portion 47b.

3.2. Method for Mounting Inertial Sensor Unit

Next, a method for mounting the inertial sensor unit 300 according to the third embodiment will be described with reference to the drawing.

In the method for mounting the inertial sensor unit 300, in a step for mounting the outer case 40, the outer case 40 is mounted to the first substrate 10 by fitting together the first mounting portions 47a and 47b and the second mounting portions 15a and 15b. Specifically, the second substrate 42 of the outer case 40 is first moved in the direction of the arrow A with respect to the first substrate 10, the first mounting portion 47a and the second mounting portion 15a are fitted together, and the first mounting portion 47b and the second mounting portion 15b are fitted together. Then, the second substrate 42 is moved until the second substrate 42 comes in contact with the stopper 19. With this configuration, the outer case 40 is mounted to the first substrate 10.

Other than those described above, the method for mounting the inertial sensor unit 300 is basically the same as the method for mounting the inertial sensor unit 100.

In the method for mounting the inertial sensor unit 300, the outer case 40 can be mounted to the first substrate 10 without using a male screw and a female screw.

In the present disclosure, a portion of the configurations may be omitted within a scope in which the features and advantageous effects described in the present application are included, or the embodiments and the modified examples may be combined.

The present disclosure is not limited to the embodiments described above, and various further modifications can be made. For example, the present disclosure includes substantially the same configuration as the configuration described in the embodiments. Substantially the same configuration is, for example, a configuration having the same function, method, and result, or a configuration having the same object and advantageous effect. Moreover, the present disclosure includes a configuration in which a non-essential portion of the configuration described in the embodiments is replaced. Moreover, the present disclosure includes a configuration providing the same operational effect as that described in the embodiments, or a configuration capable of achieving the same object. Moreover, the present disclosure includes a configuration in which a publicly known technique is added to the configuration described in the embodiments.

What is claimed is:

1. A method for mounting an inertial sensor unit, comprising:
preparing a first substrate to which a plurality of magnets are mounted,
preparing a case including a second substrate, the case accommodating an inertial sensor,
mounting the first substrate to a structure, wherein the first substrate is mounted to the structure by a magnetic force acting between the plurality of magnets and the structure; and
mounting the second substrate of the case to the first substrate, wherein
the second substrate is provided with a first mounting portion,
the first substrate is provided with a second mounting portion,
in mounting the second substrate, the second substrate is mounted to the first substrate by fitting the first mounting portion and the second mounting portion with screws, and
in the plan view, the inertial sensor is surrounded by a line connecting the plurality of magnets.

2. The method for mounting an inertial sensor unit according to claim 1, wherein
each of the screws comprising a male screw and a female screw,
the first mounting portion is composed of
a through-hole provided in the second substrate and the male screw passing through the through-hole,
the second mounting portion is composed of the female screw, and
the fitting between the first mounting portion and the second mounting portion is threaded engagement between the male screw that passed through the through-hole and the female screw.

3. The method for mounting an inertial sensor unit according to claim 1, wherein
the first mounting portion includes a female screw,
the second mounting portion is composed of
a first through-hole provided in the first substrate and
a male screw passing through the first through-hole, and
the fitting between the first mounting portion and the second mounting portion is threaded engagement between the male screw that passed through the first through-hole and the female screw.

4. The method for mounting an inertial sensor unit according to claim 3, wherein
the first mounting portion is composed of
a second through-hole provided in the second substrate and
a nut provided with the female screw threadedly engaging with the male screw that passed through the second through-hole.

5. The method for mounting an inertial sensor unit according to claim 2, wherein
in the mounting of the second substrate, the male screw is passed through a screw coming-off preventing member located between the case and the first substrate.

6. The method for mounting an inertial sensor unit according to claim 1, wherein
three or more fitting portions in each of which the first mounting portion and the second mounting portion fit together are provided, and
in the mounting of the case, the second substrate is mounted to the first substrate such that the inertial sensor is surrounded by a line connecting the three or more fitting portions in plan view in an overlapping direction of the first substrate and the second substrate.

7. The method for mounting an inertial sensor unit according to claim 1, wherein
the second substrate is provided with a third mounting portion,
the first substrate is provided with a fourth mounting portion, and
in the mounting of the case, a position of the second substrate with respect to the first substrate is determined by fitting together the third mounting portion and the fourth mounting portion.

8. The method for mounting an inertial sensor unit according to claim 1, wherein
the magnets is mounted to the first substrate by way of a screw and an adhesive.

9. The method for mounting an inertial sensor unit according to claim 1, wherein
three or more magnets are provided, and
in the mounting of the case, the second substrate is mounted to the first substrate such that the inertial sensor is surrounded by a line connecting the three or more magnets in plan view in an overlapping direction of the first substrate and the second substrate.

10. The method for mounting an inertial sensor unit according to claim 1, wherein
in the mounting of the first substrate, the first substrate is mounted such that an adjustment plate is located between the magnets and the structure, and
material of the adjustment plate is material that does not attract the magnets and that does not repel the magnets.

11. The method for mounting an inertial sensor unit according to claim 1, further comprising coupling the structure and the case with a string.

12. An inertial sensor unit comprising:
a first substrate provided with a female screw;
a plurality of magnets that is provided at the first substrate and that mounts the first substrate to a structure;
a case containing a second substrate is provided with a through-hole and in which an inertial sensor is accommodated; and
a male screw that passes through the through-hole and that is threadedly engageable with the female screw, wherein
the first substrate is mounted to the structure by a magnetic force acting between the plurality of magnets and the structure,
in the plan view, the inertial sensor is surrounded by a line connecting the plurality of magnets.

13. The inertial sensor unit according to claim 12, wherein
the magnets is mounted to the first substrate by way of a screw and an adhesive.

* * * * *